United States Patent [19]

Tran

[11] Patent Number: 5,519,837
[45] Date of Patent: May 21, 1996

[54] PSEUDO-ROUND-ROBIN ARBITRATION FOR A SHARED RESOURCE SYSTEM PROVIDING FAIRNESS AND HIGH THROUGHPUT

[75] Inventor: Chinh N. Tran, Austin, Tex.

[73] Assignee: International Business Machines Corporation, Armonk, N.Y.

[21] Appl. No.: 282,332

[22] Filed: Jul. 29, 1994

[51] Int. Cl.⁶ .......................... G06F 13/364; G06F 13/00
[52] U.S. Cl. ..................... 395/291; 395/293; 395/312; 370/85.2; 370/85.4
[58] Field of Search .................................. 395/291, 293, 395/312; 370/85.2, 85.4

[56] References Cited

U.S. PATENT DOCUMENTS

| | | |
|---|---|---|
| 4,470,114 | 9/1984 | Gerhold . |
| 4,560,985 | 12/1985 | Strecker et al. . |
| 4,969,120 | 11/1990 | Azevedo et al. . |
| 5,072,363 | 12/1991 | Gallagher . |
| 5,175,743 | 12/1992 | Crespo et al. . |
| 5,175,744 | 12/1992 | Crespo et al. . |
| 5,241,632 | 8/1993 | O'Connell et al. . |
| 5,265,215 | 11/1993 | Fukuda et al. . |
| 5,274,785 | 12/1993 | Kuddes et al. . |
| 5,280,591 | 1/1994 | Garcia et al. . |
| 5,357,512 | 10/1994 | Khaira et al. .................. 370/85.2 |
| 5,396,491 | 3/1995 | Newman .......................... 370/60 |

*Primary Examiner*—Jack B. Harvey
*Assistant Examiner*—Jeffrey K. Seto
*Attorney, Agent, or Firm*—Casimer K. Salys

[57] ABSTRACT

Systems and methods for arbitrating access to shared resources in a computer system, the systems and methods providing fairness, high throughput, timely response and area efficient implementation. In one form, the pseudo-round-robin arbitration system is composed of a binary tree architecture of round-robin cells. The requests are combined in various groupings and simultaneously provided to all the cells in the multiple levels of the hierarchy. The grant signals are generated from the lowest level of cells. The hierarchy defines that the outputs of the higher level cells serve as enablements to successively related lower level cells in progression by level. A preferred cell for the binary version of the pseudo-round-robin tree architecture is composed of two OR type gates and two AND type gates, the latter gates receiving the enablement signal from the cell in the next higher level of the tree.

15 Claims, 7 Drawing Sheets

BINARY TREE

AN N-BIT SHIFT REGISTER CAN BE USED TO STORE THE TOKEN. ONLY 1 TOKEN BIT IS ON AT ANY TIME.

FIG. 6

WRAP-AROUND SHIFT

| requester | requests | token | RR | PRR | requests | token | RR | PRR |
|---|---|---|---|---|---|---|---|---|
| group 1 { 1 | 1 | 0 | 0 | 0 | 1 | 0 | 0 | 1 |
| 2 | 0 | 0 | 0 | 0 | 0 | 0 | 0 | 0 |
| 3 | 0 | 1 | 0 | 0 | 0 | 1 | 0 | 0 |
| 4 | 1 | 0 | 1 | 1 | 0 | 0 | 0 | 0 |
| group 2 { 5 | 1 | 0 | 0 | 0 | 1 | 0 | 1 | 0 |
| 6 | 0 | 0 | 0 | 0 | 0 | 0 | 0 | 0 |
| 7 | 0 | 0 | 0 | 0 | 0 | 0 | 0 | 0 |
| 8 | 0 | 0 | 0 | 0 | 0 | 0 | 0 | 0 |
| group 3 { 9 | 0 | 0 | 0 | 0 | 0 | 0 | 0 | 0 |
| 10 | 0 | 0 | 0 | 0 | 0 | 0 | 0 | 0 |
| 11 | 0 | 0 | 0 | 0 | 0 | 0 | 0 | 0 |
| 12 | 0 | 0 | 0 | 0 | 0 | 0 | 0 | 0 |

PSEUDO-ROUND-ROBIN ARBITRATION FOR A SHARED RESOURCE SYSTEM PROVIDING FAIRNESS AND HIGH THROUGHPUT

BACKGROUND OF THE INVENTION

The present invention relates generally to arbitration in computer systems. More particularly, the invention is directed to systems and methods for arbitrating access to shared resources in a pseudo-round-robin format which provides fairness and a high rate of throughput.

Arbiters and the functions they perform have become commonplace in contemporary computer systems. This is particularly true in the context of multiple processor architectures where the control of data traffic between the processors, the memory system and input/output (I/O) units is an important aspect of the overall computer system design. The arbiter plays a critical role because it decides which elements get access to a data path in the system, whether that data path is over a shared bus or through a crossbar switch. The goal is to minimize the delay in the arbitration while satisfying the fairness standard defined by a protocol.

Though fixed priority arbiters are simple in design, they do not ensure fairness. Requesters with high priority can monopolize the shared resource by continuing to request service and always prevailing over lower priority requesters in the arbitration.

Round-robin type arbiters ensure fairness in the access to the shared resources while providing good throughput. As to the latter feature, a well designed round-robin arbiter immediately serves any pending request, if one exists. Maximum throughput to the shared resource requires that the grant of access be resolved, in the same clock cycle, if access is possible. This is in contrast to time slot allocation type of servicing of access requests.

Unfortunately, known same cycle response type round-robin arbiter architectures do not lend themselves to efficient circuit implementation, either in terms of electronic device count, semiconductor area or speed. Furthermore, conventional round-robin architecture detractions grow linearly in relation to the units potentially requesting access.

SUMMARY OF THE INVENTION

The present invention provides a pseudo-round-robin arbiter which controls access to shared resources in an order which is fair to all requesters and exhibits maximum throughput. In one form, the invention relates to a computer having multiple access requesters and multiple shared resources, where the arbiter apparatus comprises a multiplicity of arbiter cells, means for distributing grouped request signals to selected arbiter cells, and means for hierarchically connecting the arbiter cells by levels, wherein the arbiter cells at the higher level selectively control outputs from arbiter cells at lower levels. In another form, the invention is directed to processes for accomplishing the function performed by the arbiter apparatus.

According to a preferred embodiment, the arbiter apparatus conforms to a binary tree architecture in which each node of the tree is composed of a two input/two output round-robin arbiter cell. The grant outputs of each parent node arbiter cell serve as enable controls for the child node round-robin arbiter cells connected thereto. This succession continues through to the last level, where the pair of inputs and outputs to the round-robin arbiter cells comprise the request and grant signals within the system.

The round-robin arbiter cells also receive inputs from respective token lines to initiate control of the grant signals. The groupings of the token lines matches the groupings of the request lines. The round-robin arbiter cells receive inputs, composed of OR combinations of the request signals and OR combinations of token signals, by corresponding group.

The binary tree architecture and related logic for each round-robin arbiter cell defines a system in which the time delay attributed to arbitrating requests grows logarithmically with the number of requesters, in contrast to conventional arbitration architectures which exhibit a linear growth between the number of input requesters and the time needed to resolve and generate a grant output. The pseudo-round-robin apparatus in a binary architecture also lends itself to efficient, and similarly logarithmic, integrated circuit layout.

These and other features of the invention will be more clearly understood and appreciated upon considering the detailed description which follows.

DETAILED DESCRIPTION

Figure 1:
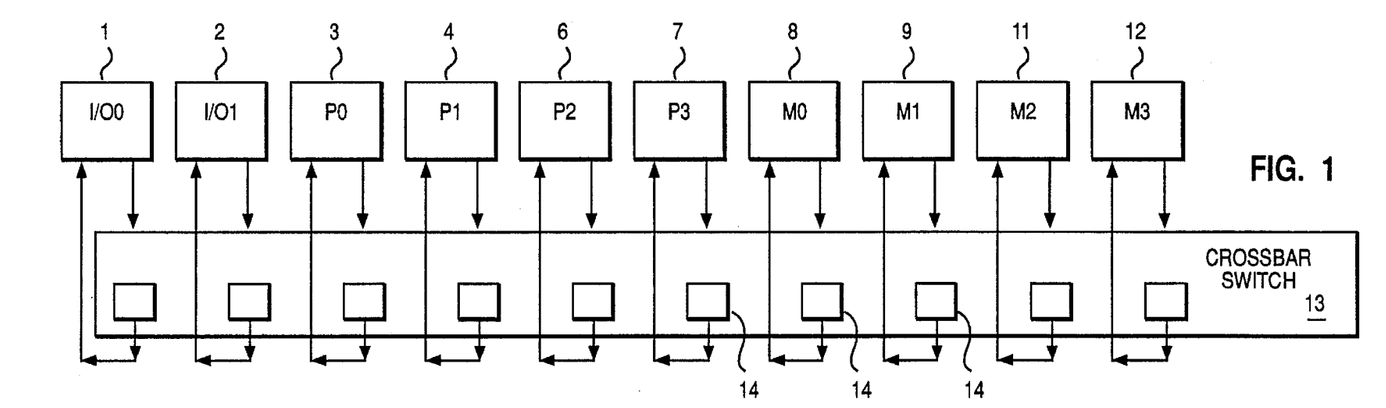
FIG. 1 is a schematic block diagram of a multiple processor shared resource computer system.

FIG. 1 illustrates by schematic block diagram the preferred environment for practicing the invention. FIG. 1 shows the interconnection of a pair of I/O units 1 and 2, processors identified by reference numerals 3, 4, 6 and 7, and memory systems identified by reference numerals 8, 9,

11 and 12 through crossbar switch 13. The crossbar switch is an ideal device to connect processors, memory systems and I/O units because it allows the maximum number of disjoint pairs of elements to be simultaneously connected. This is in contrast to an architecture which uses a bus in place of crossbar switch 13, in that the bus only allows one pair of the units to communicate during any one interval of time. The invention is directed to an arbiter system which controls access to the shared resource so that the elements connected to the same resource are granted access in a fair manner and with maximum throughput.

Figure 2:
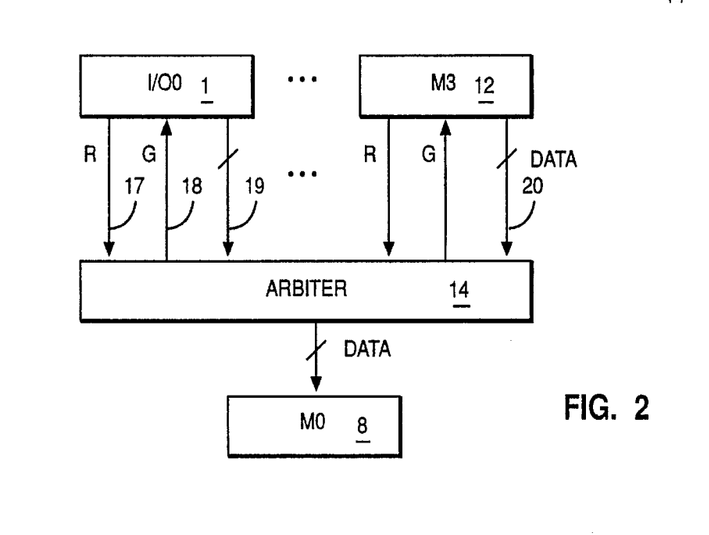
FIG. 2 is a schematic of an arbiter.

FIG. 2 depicts the functional relationship between the arbiter 14 and the various requesters. For example, when an I/O device within I/O unit IO0 desires access to memory M0 a signal is provided to arbiter 14 on request line 17. When memory M0 becomes available to accept the next access, a grant signal is returned to IO0 on grant line 18 provided IO0 wins the arbitration. The transmission of data between the I/O unit, IO0 identified by reference numeral 1, and the memory. M0 identified by reference numeral 8, is accomplished over data lines 19.

Figure 3:
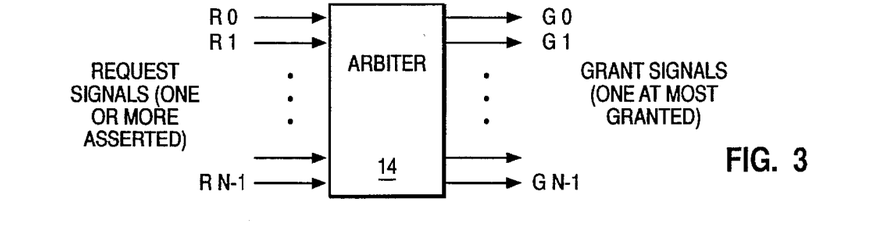
FIG. 3 is a schematic relating arbiter input requests and output grants.

As further depicted in FIG. 3, each arbiter 14 receives as inputs one or more request signals over input lines R0-RN-1. The request signals originate in the various elements, such as the processors, I/O units or memory systems shown in FIG. 1. The output of the arbiter is a single grant assertion on one of the multiple grant lines G0-GN-1 correspondingly connected to the same elements. An asserted grant signal notifies an element that it has been selected to gain access to the shared resource.

A variety of arbiter protocols and related circuits exist in the prior art. The prevailing ones arbitrate the use of the shared resource through priority concepts, round-robin concepts, or round-robin as modified by priority concepts. These designs lack parallel evaluation of the request signals, to the effect that the output of the arbiter is delayed by the processing of the request signals through successive stages in the arbiter logic.

The pseudo-round-robin arbiter of the present invention is architected and operated to minimize delays and device count, ensure fairness and maximize throughput. The pseudo-round-robin arbiter achieves the smaller delays by performing round-robin arbitration on multiple smaller sets of requests in parallel. The requests are organized into several groups of equal or approximately equal size. The requests within each group are combined into a group request. Then, the group requests are used to arbitrate among the groups. At the same time, arbitration is done within each group. The final grant is the grant from the group which has won the arbitration among the groups. As would be expected, there can be more than one level of grouping.

Figure 4:
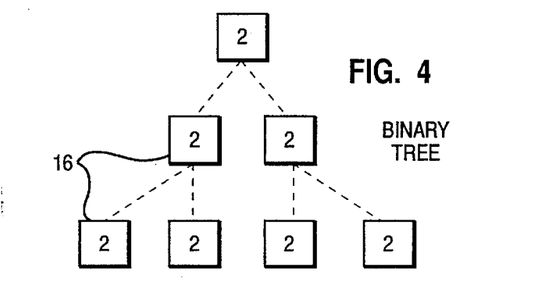
FIG. 4 is a block diagram functionally depicting a binary tree architecture.

A preferred architecture for the round-robin arbiter is the binary tree structure shown in FIG. 4. Each cell, at each level of the tree arbitrates between two requests and provides a grant to a maximum of two child cells within the tree.

Figure 5:
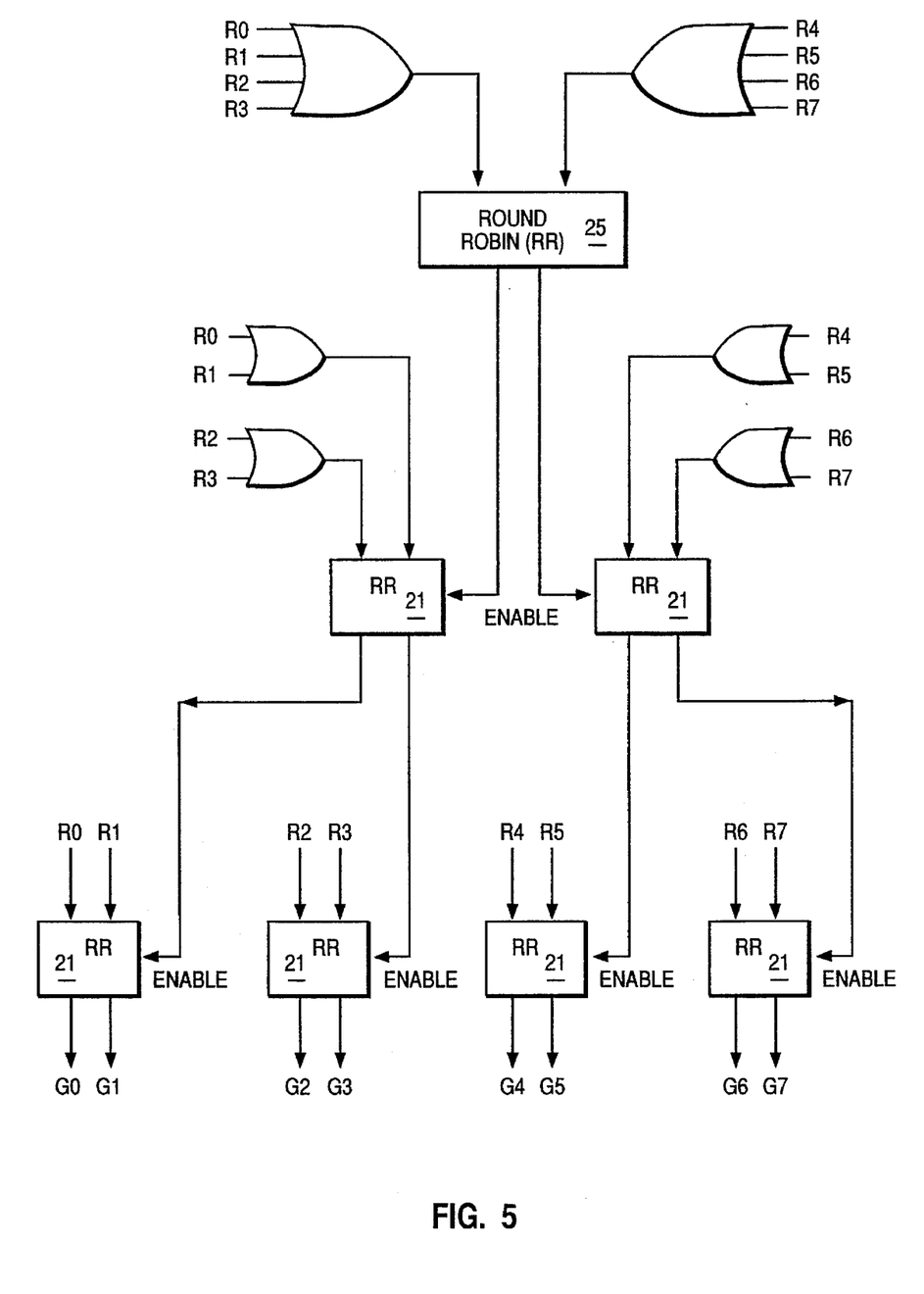
FIG. 5 is a diagram schematically depicting the request and grant lines for a binary tree pseudo-round-robin architecture.

A pseudo-round-robin arbiter of the preferred binary tree form, with resources for resolving access requests by 8 elements, is shown by functional and logic cells in FIG. 5. The logic within each round-robin arbiter cell 21/25 can be derived from the prior art, or involve the use of the preferred implementation in FIG. 7. Round robin cell 25 differs from other cells 21 by its absence of an enable input. Each of cells 21 and 25 are small, independent round-robin arbiters having two input lines, the requests, and two output lines, the grants. Note that at levels above the lowest level the request signals R0-R7 are grouped by logical OR into the binary format for input into the cells.

The highest level round-robin arbiter cell 25 receives as one input the OR combination of requests R0-R3 and as a second input the OR combination of requests R4-R7. The outputs from this arbiter cell are enable signals controlling round-robin arbiters cells at the next successive level, the second, in the hierarchy. At the second level, one of round-robin arbiter cells 21 receives as one input the OR combination of R0 and R1 and as its second input receives the OR combination of R2 and R3. At the same time, the other round-robin arbiter cell at the second level in the hierarchy receives as one input the OR combination of R4 and R5 and as its second input the OR combination of requests R6 and R7. The respective outputs of the two round-robin arbiter cells at the second level provide enable signals for the next successive level, the lowest, of round-robin arbiter cells in the binary progression. Note in FIG. 5 that the grant signals G0–G7 are derived from the lowest level of the tree of round-robin arbiters cells. The token inputs to the succession of round-robin arbiters cells are directly analogous to the request inputs, both in terms of the OR gates used and relative counts. This will be apparent from the example in FIG. 9.

One thing that is important to recognize about this layout of cells is that the arbitration of the requests R0–R7 is accomplished in parallel, the enable signals being the only signals progressing sequentially down the tree. The benefits appear in the speed of the circuit.

Figure 6:
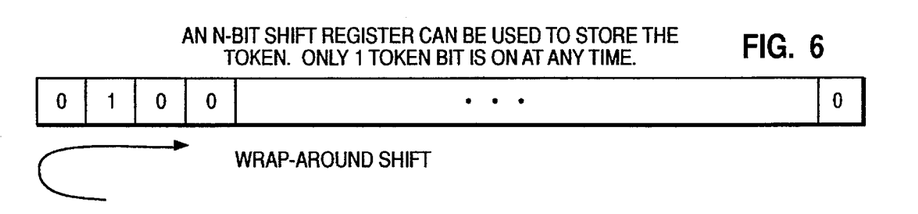
FIG. 6 schematically depicts one arrangement of a token generator.

The pseudo-round-robin arbiter depicted in FIG. 5 does not include the token generation or input into the cells of the binary tree. FIG. 6 illustrates the concept of token generation as may be applicable to any pseudo-round-robin architecture chosen. The token register in FIG. 6 indicates which requester currently has the highest precedence. The token shifts after each grant to the next active request, or simply to the next position. Since numerous token schemes are possible, FIG. 6 merely illustrates one of many that may be used in conjunction with the binary tree format pseudo-round-robin arbiter of FIG. 5.

Figures 7, 8:
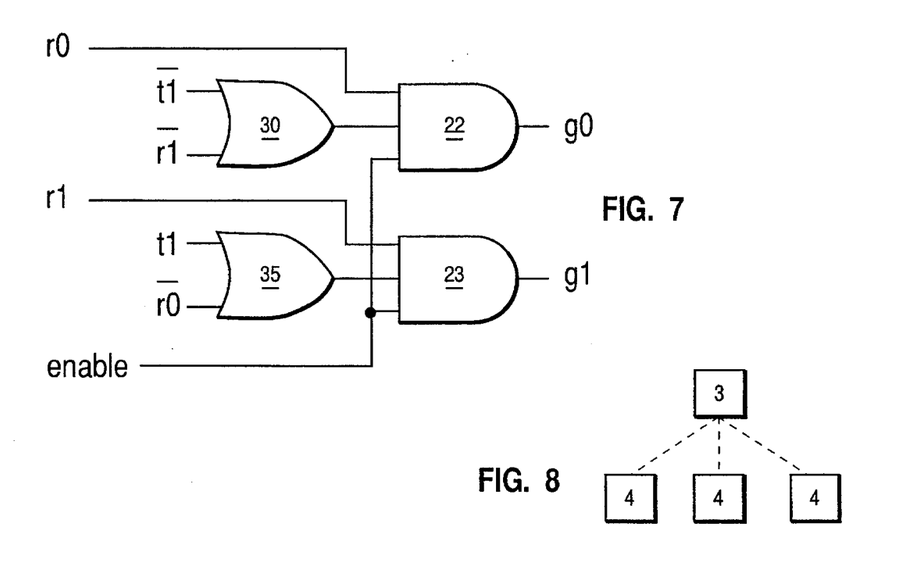
FIG. 7 is a logical circuit for an arbiter cell optimized for use with the binary tree pseudo-round-robin arbiter architecture depicted in FIG. 4.
FIG. 8 is a block diagram functionally depicting a tree for a pseudo-round-robin arbiter in an architecture other than a binary tree.

FIG. 7 illustrates the preferred logic for a round-robin arbiter cell 21 as applicable to the binary tree architecture of FIG. 5. The cell includes a pair of AND gates 22 and 23 which respectively generate grant signals G0 and G1. The introduction of the enable signal at the AND gate stage allows the arbitration within the cell to occur in parallel with other arbitrations. Therefore, each level of the hierarchy introduces a cost of only one additional AND gate delay.

The preferred implementation of the binary tree cell logic as appears in FIG. 7 includes a pair of OR gates 30 and 35 in addition to AND gates 22 and 23. The request, token, and respective complements have been selected and arranged to ensure an appropriate and immediate grant response even when the token resides in another cell at the same level. It should be apparent that functionally corresponding operations can be performed by logic gates of different forms through classical Boolean manipulation.

FIG. 8 illustrates another architecture for practicing the pseudo-round-robin arbiter of the present invention. A comprehensive depiction including the various cells, request inputs, grant outputs and token inputs appears in FIG. 9. The token scheme can again involve the use of a shift register as originally described with reference to FIG. 6, or another token generation techniques.

Figure 9:
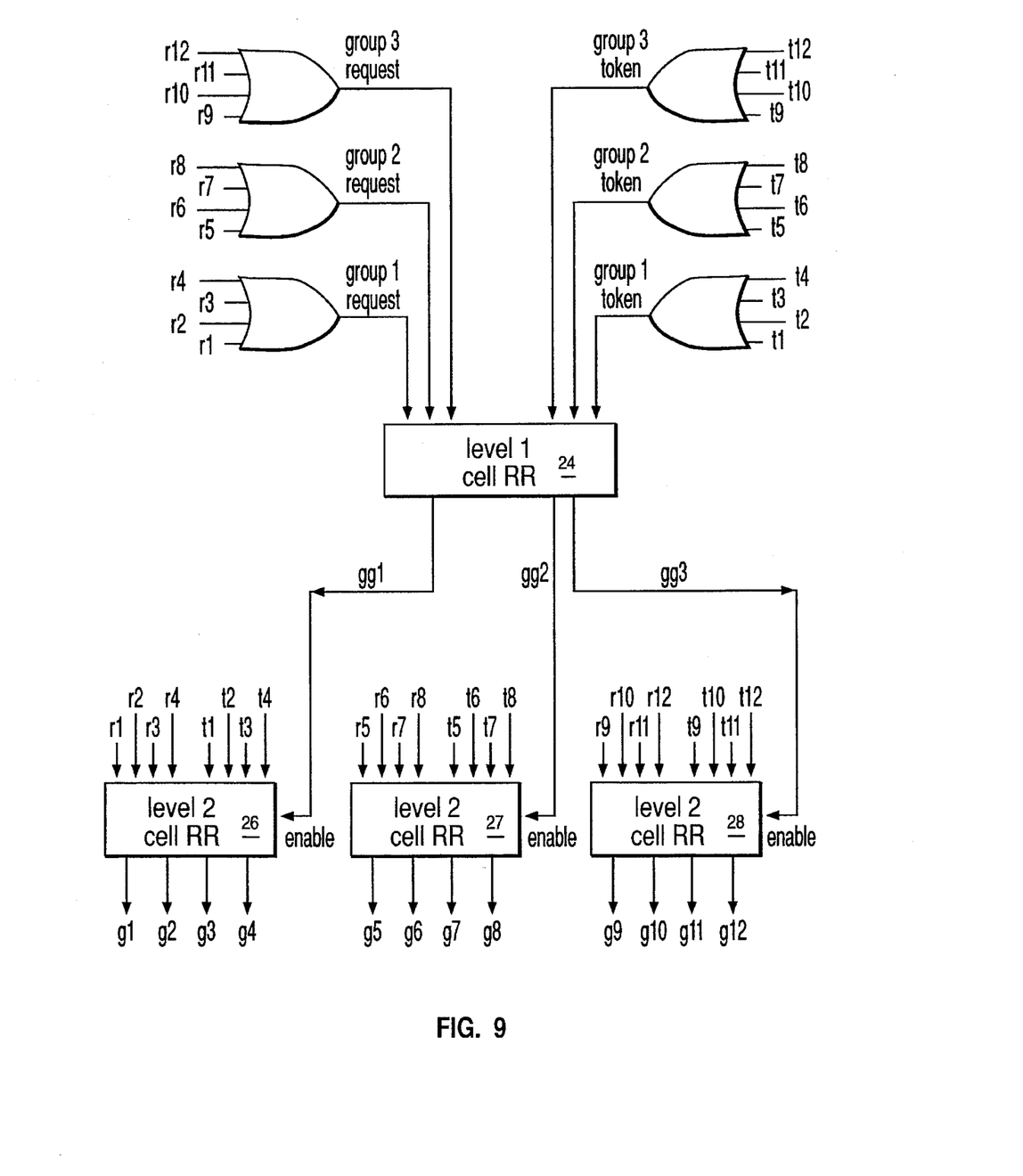
FIG. 9 is a block diagram of a pseudo-round-robin arbiter apparatus using the tree architecture depicted in FIG. 8, including token state inputs.

The round robin policy in each cell of FIG. 9 arbitrates the requests based upon the position of the token, and provides a maximum of one grant output. The arbiter uses a 12 bit shift register of the form described with reference to FIG. 6.

Level 1 round-robin arbiter cell 24 arbitrates between groups 1–3. The inputs to cell 24 are OR logic combinations of requests and tokens for each of the groups. Level 2 cells 26, 27 and 28 are selectively enabled by the three grant outputs from level 1 cell 24. Therefore, even though the pseudo-round-robin arbiter of the present invention is preferably implemented in a binary tree architecture with binary cells, FIG. 9 illustrates that the underlying concepts of grouping and parallel evaluation are applicable to diverse configurations of requests and cells.

Figure 10:
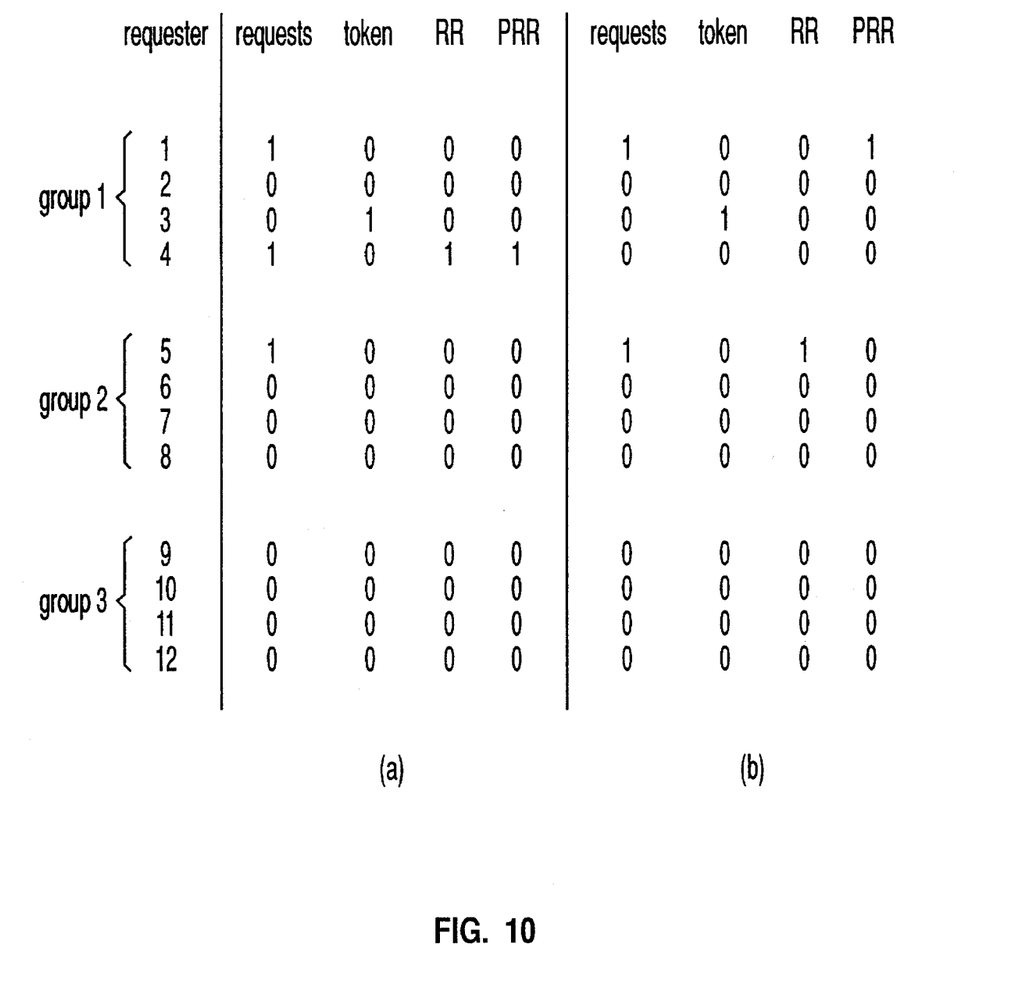
FIG. 10 is a table setting forth sample states for comparing the operation of the pseudo-round-robin arbiter apparatus in FIG. 9 with that of a conventional round-robin arbiter apparatus.

The table in FIG. 10 compares the outputs of a conventional round-robin (RR) arbiter with the presently disclosed pseudo-round-robin (PRR) arbiter for two scenarios of requests with the same token state. Note for the sequence of requests in (a), wherein requesters 1, 4 and 5 have signalled affirmatively, that the RR and PRR systems produce identical outputs. In contrast, for the same token state the sequence in section (b) of the table indicates a different outcome between a conventional round-robin arbiter and the presently disclosed pseudo-round-robin arbiter when only requesters 1 and 5 are active. The pseudo-round-robin arbiter retains the fairness characterizing round-robin arbiters, maximizes throughput, and provides a tree type parallel architecture in which requests and token evaluation is accomplished nearly simultaneously at all levels of the tree.

Figure 11:
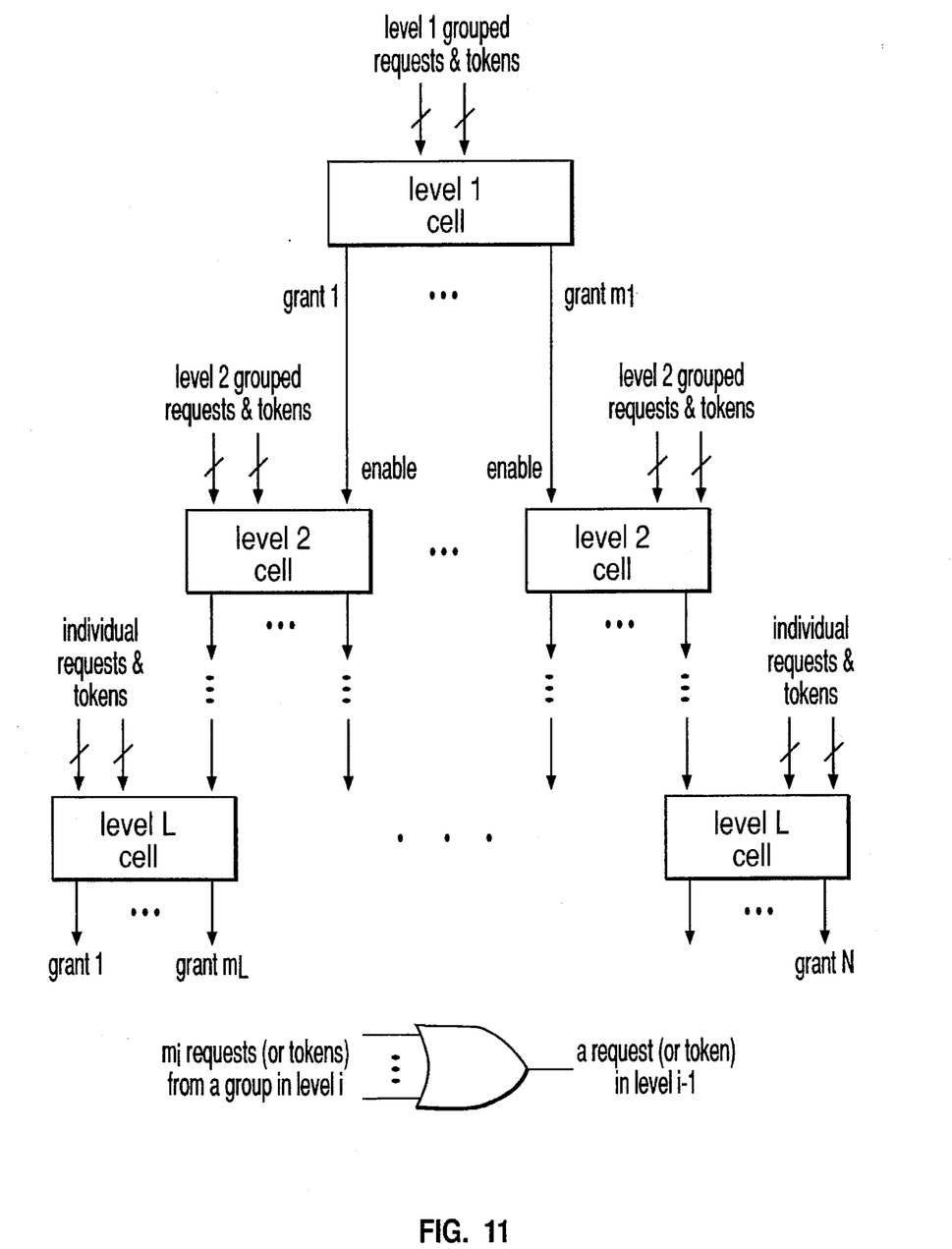
FIG. 11 is schematic illustrating the pseudo-round-robin architecture by generic tree representation.

FIG. 11 depicts a generalized implementation of the architecture and method for the pseudo-round-robin arbiter. As shown, the invention involves a multilevel tree architecture in which requests and tokens are grouped at successive levels of the tree. The highest level cell in the tree does not include any enable input. The preferred form binary tree is shown in FIG. 4, with the associated preferred cell logic appearing in FIG. 7.

With the example token scheme shown in FIG. 6, a pseudo-round-robin arbiter must incorporate in each cell resources for servicing a request when no token is active for that cell one solution is to simply incorporate a fixed priority which allows a cell to grant a request even if the group does not have a token. For example, if there is only one request, but the token in currently in a different group, this request is granted by the lowest level cell. Operationally this ensures that when there is at least one request there will be a grant. This refinement is integrated into the binary tree architecture of FIG. 4 when using the cell logic depicted in FIG. 7.

Figure 12:
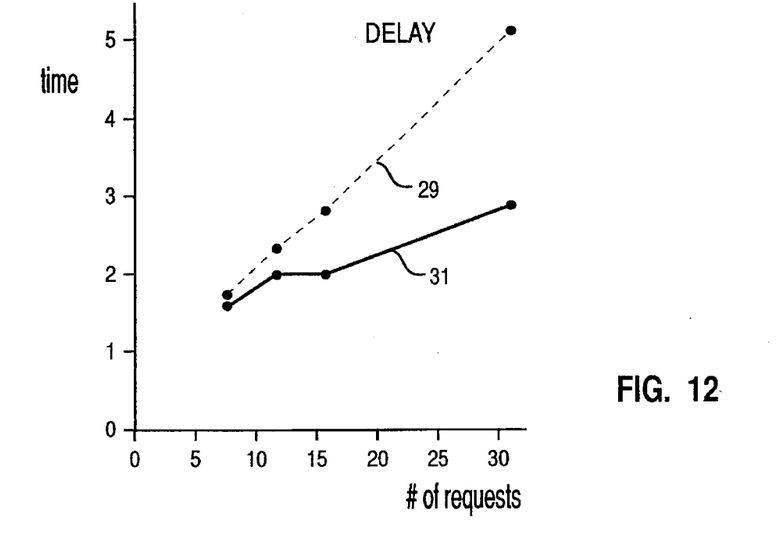
FIG. 12 provides plots comparing the performance of the binary tree pseudo-round-robin arbiter apparatus to a round-robin arbiter apparatus.

The pseudo-round-robin arbiter design provides a shorter delay in resolving the arbitration and consumes less area when implemented with integrated circuit devices. FIG. 12 illustrates the relative amounts of delay associated with a pseudo-round-robin arbiter in comparison to a convention round-robin arbiter. Dashed line plot 29 represents the delay in a conventional round-robin arbiter. Note the linear growth with the number of input requests being managed by the arbiter. In contrast, the pseudo-round-robin arbiter of the present invention exhibits a logarithmic growth in the delay as the number of requests increases. See line 31. This reduced rate of growth in delay is attributed to the parallelism in the tree structure and the introduction of the enable signals into the last stage of the cell logic. The benefits of such an improvement become particularly important with contemporary and future computer architectures, given the trend toward high numerical count multi-processor systems.

Figure 13:
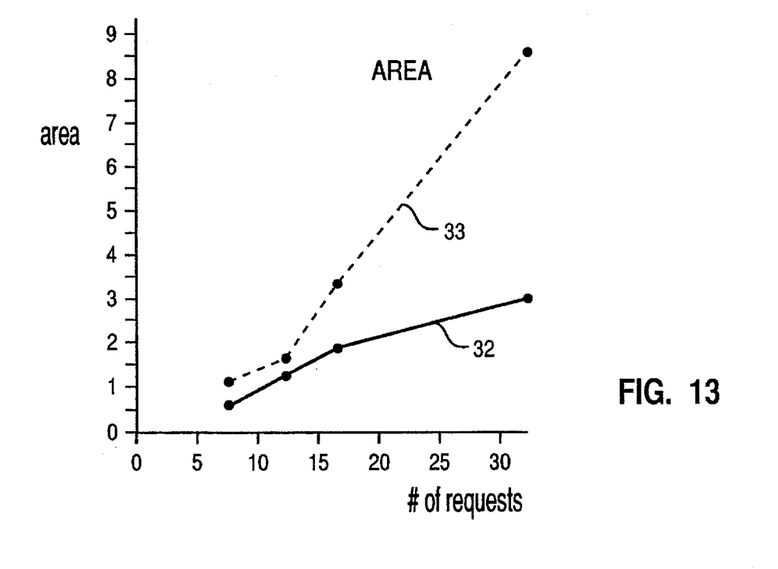
FIG. 13 provides plots comparing the semiconductor area of a binary tree pseudo-round-robin arbiter apparatus to a round-robin arbiter apparatus.

A similar benefit accrues in terms of the silicon area consumed in creating an integrated circuit pseudo-round-robin arbiter. This is particularly true if one uses the preferred binary tree architecture in FIG. 4 and related logic cell in FIG. 7. The symmetry inherent in binary tree circuits permits efficient layout. The Preferred pseudo-round-robin arbiter also needs fewer gates. FIG. 13 compares the relative area of a binary tree pseudo-round-robin arbiter using the cell in FIG. 7, solid line 32, to the area needed for a conventional round-robin arbiter, represented by dashed line 33. Again, the growth for the round-robin implementation is relatively linear with the number of requesters in contrast to a relatively logarithmic growth for the pseudo-round-robin arbiter.

The pseudo-round-robin arbiter of the present invention retains the fairness of the round-robin arbiter, provides maximum throughput to the shared resource, provides a proportionately lower time delay as the number of requests increases, and consumes a proportionately lower amount of semiconductor area.

Through the invention has been described and illustrated by way of specific embodiments, the systems and methods encompassed by the invention should be interpreted to be in keeping with the breadth of the claims set forth hereinafter.

I claim:

1. In a computer system having multiple access requesters and shared resources, an arbiter apparatus, comprising:

a multiplicity of arbiter cells having inputs and outputs connected in a hierarchy of multiple levels;

means for directly receiving and arbitrating the same access request signals in arbiter cells at multiple levels in the hierarchy; and means for outputs from arbiter cells at a higher level in the hierarchy to directly control outputs from arbiter cells at a successively lower level in the hierarchy.

2. The apparatus recited in claim 1, wherein the access request signals are distributed concurrently to receiving arbiter cells for concurrent evaluation.

3. The apparatus recited in claim 2, wherein the arbiter cells are round-robin arbiters responsive to a token when multiple access requests are received concurrently.

4. The apparatus recited in claim 3, wherein the direct control of arbiter cell outputs involves a disablement of an arbiter cell output.

5. The apparatus recited in claim 1, where the arbiter cells are round-robin arbiters responsive to a token when multiple access requests are received concurrently.

6. The apparatus recited in claim 3, wherein the hierarchy of arbiter cells is in the form of a binary tree architecture.

7. The apparatus recited in claim 5, wherein the hierarchy of arbiter cells is in the form of a binary tree architecture.

8. An arbiter cell, comprising:

cell inputs for receiving first and second access request signals, a token status signal and enable state signal;

first circuitry generating a first output in response to the second access request signal, the token status signal, the first access request signal, and the enable state signal; and second circuitry generating a second output in response to the first access request signal, the token status signal, the second access request signal, and the enable state signal.

9. The cell recited in claim 8, wherein the first and second circuitry includes AND logic.

10. The cell recited in claim 9, wherein the combination of access request signals with token status signals is accomplished in circuitry having OR logic.

11. A computer system, comprising:

at least one processor;

at least one memory;

at least one I/O unit;

a crossbar switch interconnecting at least one processor, at least one memory and at least one I/O unit;

a pseudo-round-robin arbitration means controlling the crossbar switch, the arbitration means comprising multiple levels of hierarchically connected arbiter cells, directly receiving and arbitrating the same access request signals in arbiter cells at multiple levels in the hierarchy, and having arbiter cells at a higher level in the hierarchy directly control outputs from arbiter cells at a successively lower level in the hierarchy.

12. The system recited in claim 11, wherein the direct control of arbiter cells involves a disablement of an arbiter cell output.

13. A method of arbitrating multiple access requests involving shared resources using multiple arbiter cells configured in a multiple level hierarchy, comprising the steps of:

arbitrating among the multiple access request signals in arbiter cells at a first level in the hierarchy;

concurrently arbitrating among the multiple access request signals in arbiter cells at a second level, lower than the first level, of the hierarchy; and directly controlling the outputs of second level arbiter cells in response to outputs of first level arbiter cells.

14. The method recited in claim 13, wherein the arbiter cells are round-robin arbiters responsive to a token when multiple access requests are received concurrently.

15. The method recited in claim 14, wherein the multiple level hierarchy of arbiter cell is a binary tree architecture.

* * * * *